US005726429A

United States Patent [19]
Lim

[11] Patent Number: 5,726,429
[45] Date of Patent: Mar. 10, 1998

[54] PROTECTIVE COVER FOR A CONVECTION MICROWAVE OVEN

[75] Inventor: Gyu Sik Lim, Suwon, Rep. of Korea

[73] Assignee: Samsung Electronics Co., Ltd., Suwon, Rep. of Korea

[21] Appl. No.: 721,527

[22] Filed: Sep. 26, 1996

[30] Foreign Application Priority Data

Sep. 10, 1995 [KR] Rep. of Korea .................. 95-28176

[51] Int. Cl.$^6$ .................. H05B 6/64; H05B 6/80; A23L 1/00

[52] U.S. Cl. .................. 219/757; 99/451; 99/DIG. 14; 219/756

[58] Field of Search .................. 99/451, DIG. 14, 99/476; 126/21 A; 361/384; 219/756–758, 736–744, 728, 759, 763; 426/243; 312/236

[56] References Cited

U.S. PATENT DOCUMENTS

| | | | |
|---|---|---|---|
| 4,100,463 | 7/1978 | Sugie | 219/761 X |
| 4,546,225 | 10/1985 | McCammon | 219/749 |
| 4,582,971 | 4/1986 | Ueda | 99/325 |
| 4,587,393 | 5/1986 | Uedaq | 99/451 |
| 4,623,771 | 11/1986 | Sakino | 219/757 |
| 4,743,728 | 5/1988 | Nagafusa et al. | 126/21 A |
| 4,812,617 | 3/1989 | Takeuji | 99/DIG. 14 |
| 5,393,961 | 2/1995 | Umekage | 219/757 |

*Primary Examiner*—Timothy F. Simone
*Attorney, Agent, or Firm*—Burns, Doane, Swecker & Mathis, L.L.P.

[57] ABSTRACT

A microwave oven includes a cooking chamber in which either microwave cooking or hot air convection cooking can be performed. A cooling chamber is situated rearwardly of the cooking chamber for housing a motor and cooling fan. A rear cover of the cooling chamber includes air intake and air exhaust holes formed therein for circulating a cooling air flow produced by the fan. The cover includes a vertical central surface in which the air intake holes are formed, as well as additional surfaces extending obliquely forwardly from respective edges of the central surface. The additional surfaces include a top surface, a bottom surface, and right and left side surfaces. Each of those additional surfaces, except for one of the side surfaces, includes air exhaust holes. Each of the air exhaust holes includes a rearward projection extending thereabove to resist the entry of water. Each of the air intake holes includes a projection extending forwardly from an edge thereof and inclined toward a central axis of the air exhaust hole to resist the entry of foreign objects. A rearward protrusion formed on the central surface serves to space the air intake openings from a surface located adjacent to the microwave oven.

8 Claims, 5 Drawing Sheets

PROTECTIVE COVER FOR A CONVECTION MICROWAVE OVEN

BACKGROUND OF THE INVENTION

The present invention relates to a convection microwave oven having a cooking function using a forced convection of hot air heated by an electric heater in addition to a basic cooking function by means of a high frequency energy, and more particularly, to a protective cover installed on the back side of a microwave oven to protect and cool a fan motor.

Generally, a microwave oven is a cooking appliance which cooks foods by frictional heat generated by causing the molecules of the foods being cooked to move at high speeds by using high frequency energy. Recently, developed is a convection microwave oven having an additional cooking function by forced convection of hot air created by an electric heater and a blower fan.

In such a convection microwave oven, foods such as meat and fish are cooked evenly from surface to interior by the high frequency energy and at the same time, the surface of the foods is browned to a crisp by the hot air, so that the taste and flavor of foods are enhanced. Of course, the convection microwave oven can only use either the high frequency energy or the heater at one time.

FIG. 5 illustrates a prior art convection microwave oven disclosed in Japanese Utility Model Publication No. 57-132118. As shown in FIG. 5, the prior art convection microwave oven has an inner case 1*a* forming a cooking chamber 1 and an outer case 6 surrounding the inner case 1*a*, wherein an electric component compartment (not shown) for mounting various electric components is located between the inner and outer cases 1*a* and 6.

At the back of the cooking chamber 1, a duct 7*a*is provided between a back side plate 4*a* coupled to the rear portion of the inner case 1*a* and the outer case 6 to form a hot air chamber 7 in which a blower fan 8 and an electric heater(not shown) are provided. To an inner wall of the duct 7*a*, a thick insulating material 7*b*is fixed to prevent heat radiated from the heater from transferring backward. Behind the duct 7*a*, a cooling fan 8*a* coaxially engaged with the blower fan 8 and a motor 8*b* for operating the cooling fan 8*a* and the blower fan 8, are also installed.

The duct 7*a*, the cooling fan 8*a* and the motor 8*b* are surrounded by a back side plate 6*a* coupled to the rear portion of the outer case 6. The back side plate 6*a* has a plurality of air vents 9*a* and 9*b* for venting air in accordance with operation of the cooling fan 8*a*.

In such a prior art convection microwave oven, since the plurality of air vents 9*b*, formed in the back side plate 6*a* of the outer case 6 surrounding the motor 8*b*, are made to pass through from the surface of the back side plate 6*a*, water permeating through these air vents 9*b* causes electric leakage or electric breakdown of the motor 8*b*. That is, if water is dropped on the back side plate 6*a* of the outer case 6 due to careless usage, the water does not gravitate to the bottom of the back side plate 6*a* fall off, but flows inside through the air vents 9*b*, thereby causing a dangerous short-circuit or breakdown. In addition, due to the air vents 9*b* whereby foreign materials can permeate the back side plate 6*a* easily whereby, the motor 8*b* and cooling fan 8*a* are apt to become damaged.

SUMMARY OF THE INVENTION

Therefore, it is an object of the present invention to provide a protective cover for a convection microwave oven capable of preventing water falling along the back side of an outer case from permeating through air vents, and of preventing foreign materials from being able to penetrate inside.

In order to achieve this object, this invention provides a protective cover for covering a duct located in back of a cooking chamber, the protective cover comprising a central surface, a top surface extended aslant from the central surface, a right side surface extended aslant from the central surface, a left side surface extended aslant from the central surface, and a bottom surface extended aslant from the central surface. The central surface has a plurality of air intake holes for enabling the outside air to be drawn in by a cooling fan coupled to an outer wall of the duct. The top surface, bottom surface, and left side surface have a plurality of exhaust holes, respectively, for exhausting the air circulated by the cooling fan from inside to outside.

A plurality of rearward guide projections are formed over respective exhaust holes disposed on the top surface to prevent water from permeating to the inside.

Further, a plurality of inward guide projections are extended downwardly aslant in each of the intake holes formed in the central surface to prevent foreign materials from penetrating to the inside.

In addition, a spacer is projected rearward from the central surface so that the intake holes are spaced, at a predetermined interval, from an external wall.

As mentioned above, since the top portions of the exhaust holes formed on the protective cover are surrounded by the outward guide projections, water does not permeate directly inside the microwave oven through the exhaust holes. Rather, the water bypasses along the outer surface of the protective cover and then drops down.

Since the intake holes formed on the central surface of the protective cover have the inward guide projections extended downwardly aslant, each entrance of the intake holes is not opened to the outside directly, so that any foreign materials, such as a stick or a pin, can not be penetrated into the inside through the intake holes carelessly or intentionally.

Further, the intake and exhaust holes are spaced, by a predetermined interval, from an external wall by the spacer projected outward from the central surface of the protective cover, so that it guarantees free ventilation of the outside air.

DETAILED DESCRIPTION OF THE PREFERRED EMBODIMENT

Figure 1:
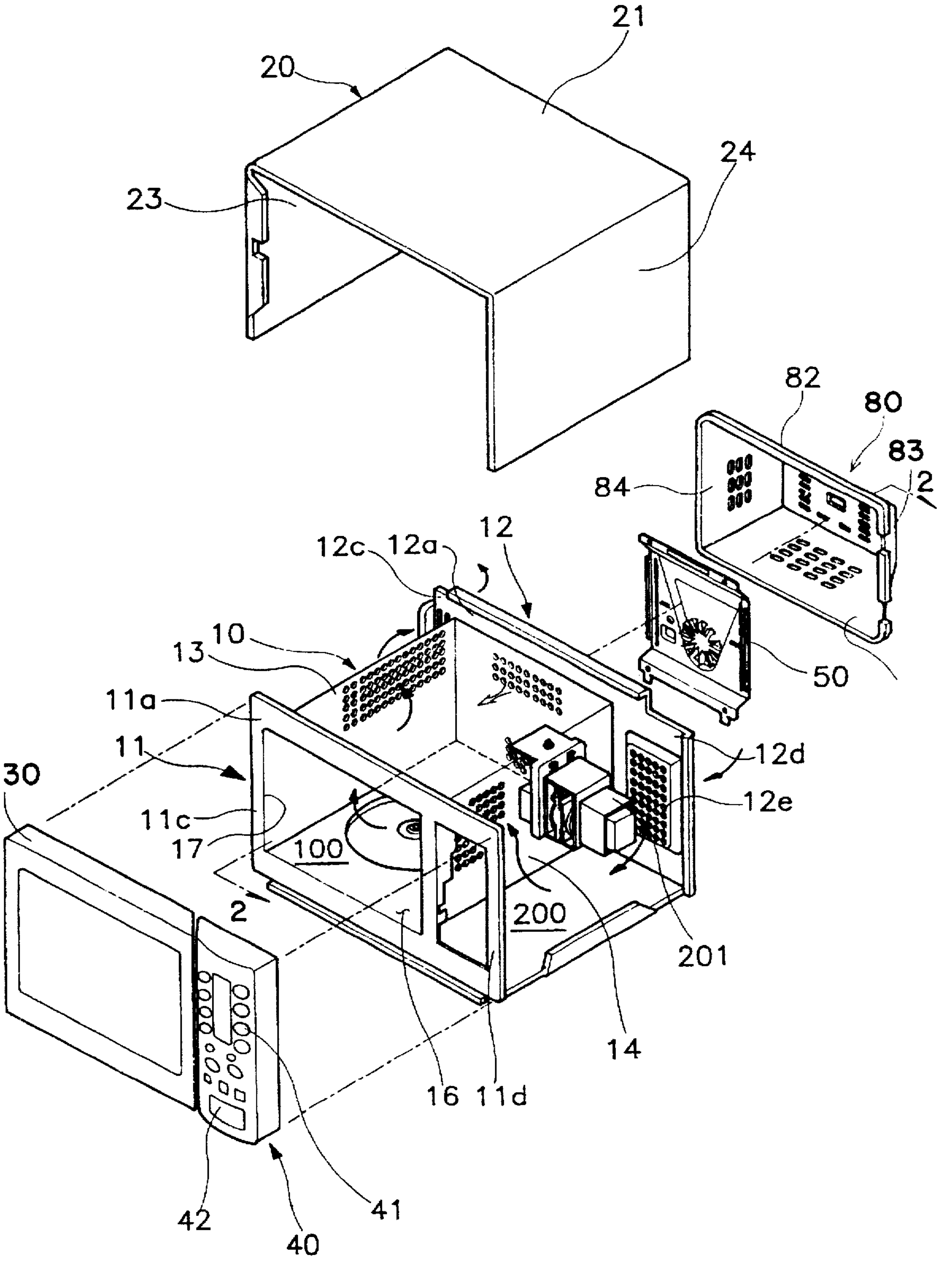
FIG. 1 is an exploded perspective view of a convection microwave oven to which the present invention is applied.

As shown in FIG. 1, a convection microwave oven to which the present invention is applied is comprised of an inner case 10, an outer case 20 which forms one assembly together with the inner case 10, and various kinds of electric components mounted between the inner and outer cases 10 and 20. In the back of the inner case 10, a duct 50 and a protective cover 80 are removably installed.

The inner case 10 is comprised of a front plate 11, a rear plate 12, a left side plate 13, a right side plate 14, and a bottom plate 16 which form a cooking chamber 100. In the front plate 11, an opening 17, which functions as the inlet of the cooking chamber 100, is formed. The front plate 11 includes an upper extending plate 11*a*, a left extending plate 11*c*, and a right extending plate 11*d*, each being extended in the upper and left and right directions to a predetermined width. The rear plate 12 facing the front plate 11 also includes an upper extending plate 12*a*, a left extending plate 12*c*, and a right extending plate 12*d*, each being also extended in the upper and left and right directions to a predetermined width.

The outer case 20 includes an top plate 21, a left side plate 23, and a right side plate 24. Edges of each plate forming the outer case 20 are coupled to edges of the extending plates forming the front and rear plates 11 and 12 of the inner case 10 to form a main body of the microwave oven.

Here, lengths from the front to the rear of the plates forming the outer case 20 are equal to the lengths of corresponding plates forming the inner case 10, and the outer case 20 is projected outward from the inner case 10 as far as the widths of the extending plates of the inner case 10. The rear plate 12 of the inner case 10 also serves as the rear plate of the outer case 20.

On the front plate 11 of the inner case 10, a door 30 is mounted to open and close the cooking chamber 100, and on the right extending plate 11*d* of the front plate 11, there is a control panel 40 having a display 41 and buttons 42.

In a space formed between the right side plates 14 and 24 of the inner and outer cases 10 and 20, and the right extending plates 11*d* and 12*d* of the front and rear plates 11 and 12, is provided an electric component compartment 200 in which electric components such as a magnetron 201 are mounted.

Figure 2:
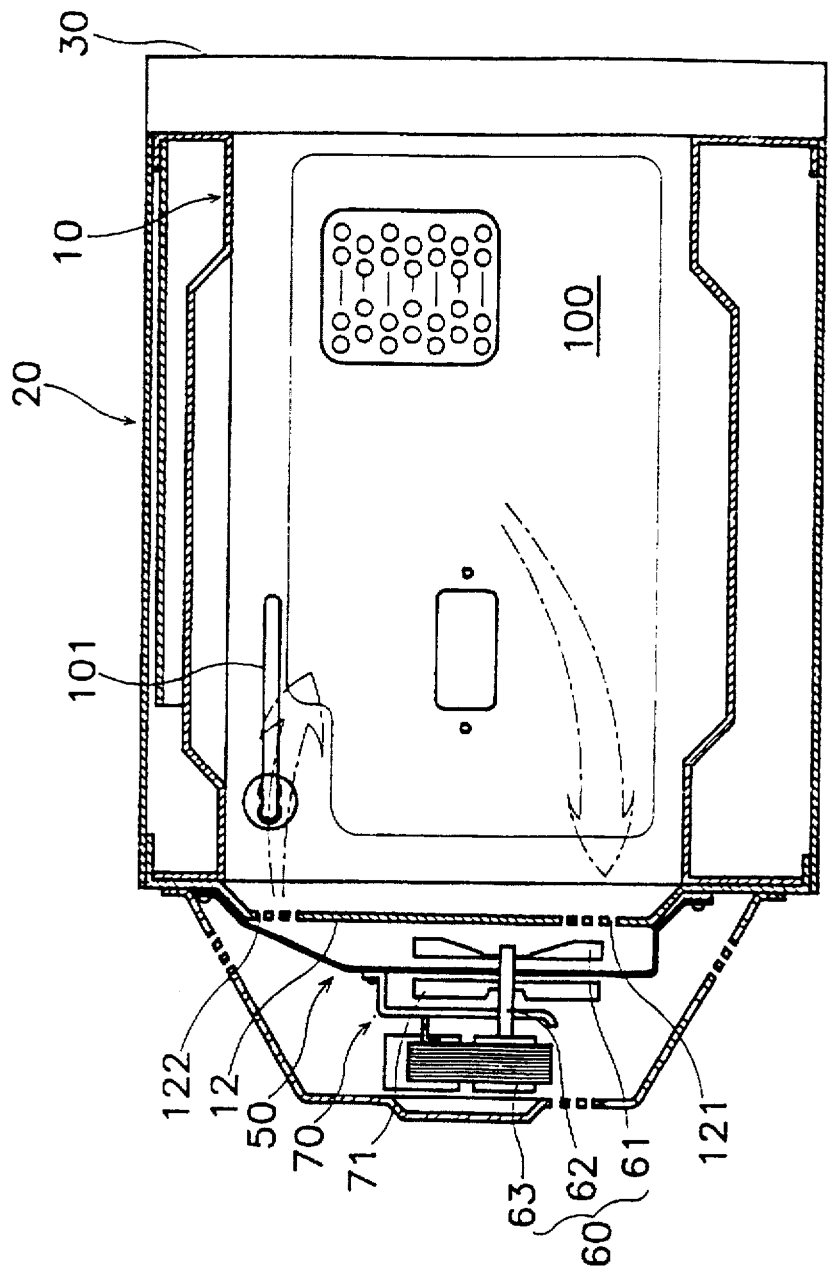
FIG. 2 is a cross-sectional view taken along line 2—2 in FIG. 1.

As shown in FIG. 2, an electric heater 101 functioning as a heating means is installed inside of the cooking chamber 100. The electric heater 101 is pivotally mounted on the upper portion of the cooking chamber 100. A plurality of intake and exhaust holes 121 and 122 for guiding forced convection of hot air are formed in the rear plate 12 of the inner case 10, and a duct 50 is arranged at the outside of the rear plate 12. Thus, the intake and exhaust holes 121 and 122 serve to communicate the cooking chamber 100 with the duct 50.

In the duct 50, a convecting means 60 and a cooling means 70 are provided. The convecting means 60 includes a blower fan 61 installed inside of the duct 50, a rotating shaft 62 passing through the duct 50 and connected to the blower fan 61, and a motor 63 connected to one end of the rotation shaft 62. The cooling means 70 includes a cooling fan 71 coupled to the shaft 62 between the duct 50 and the motor 63.

To protect the duct 50, the cooling fan 71, and the motor 63, a protective cover 80 having a size large enough to fully cover them is also mounted on the rear plate 12 of the inner case 10 to define a back wall of a cooling chamber in which the motor 63 and cooling fan 71 are situated.

Figure 3:
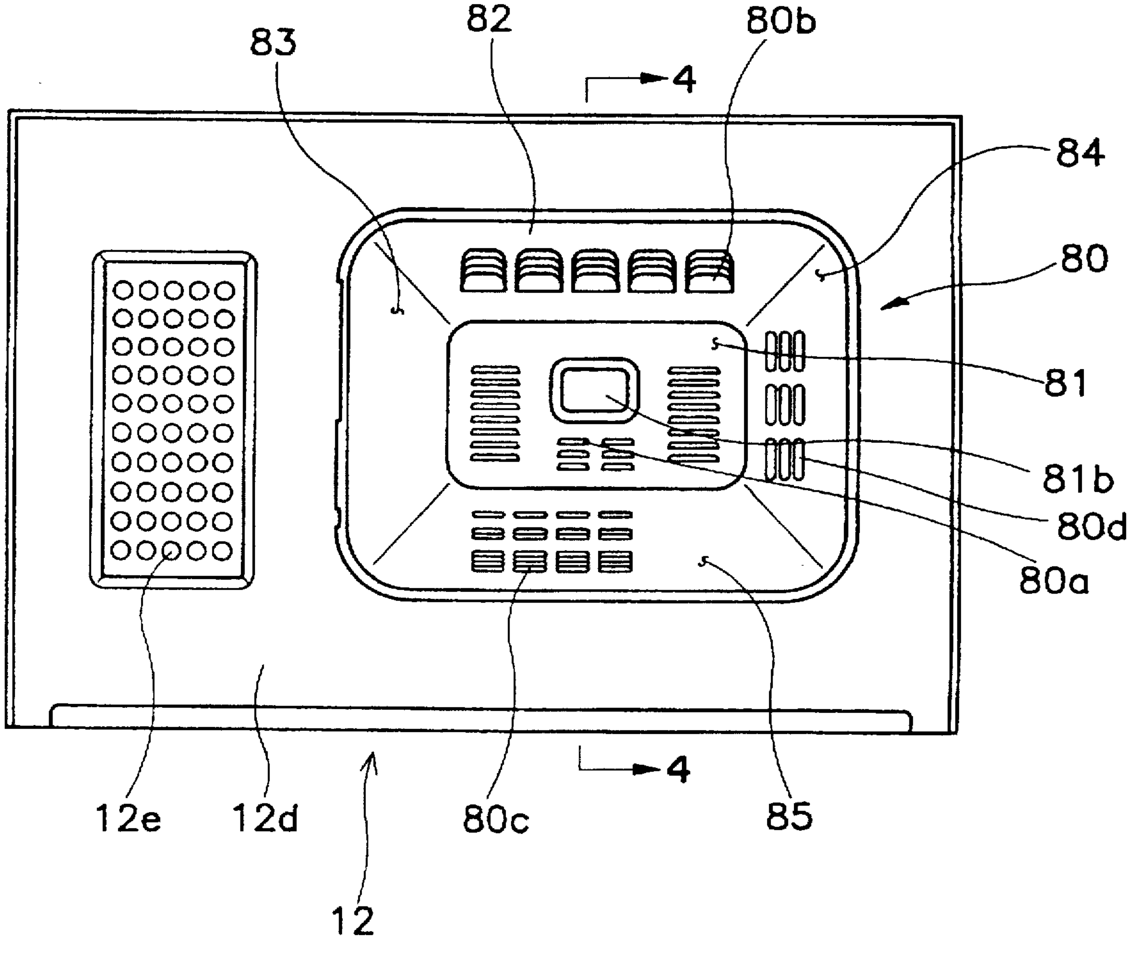
FIG. 3 is a back side view of a protective cover according to the present invention.
Figure 4:
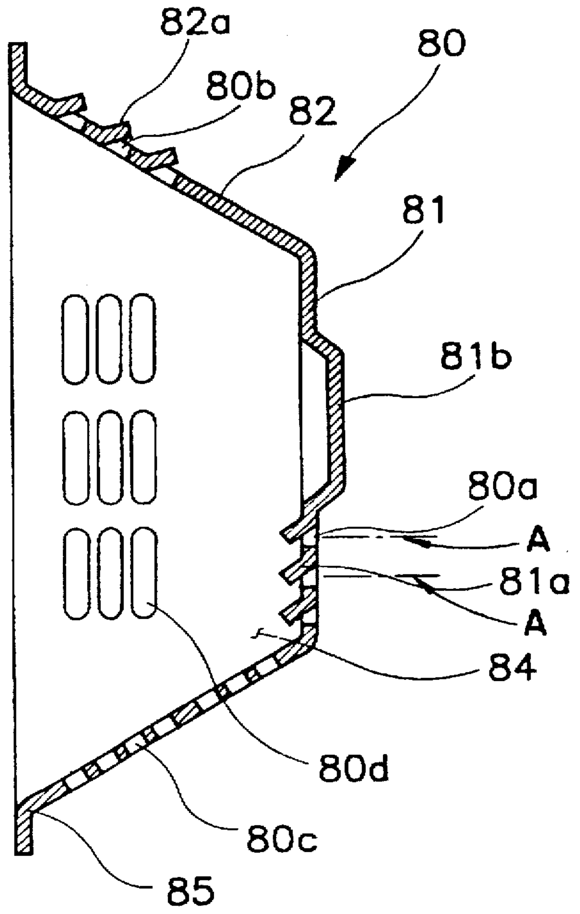
FIG. 4 is a cross-sectional view taken along line 4—4 in FIG. 3.
Figure 5:
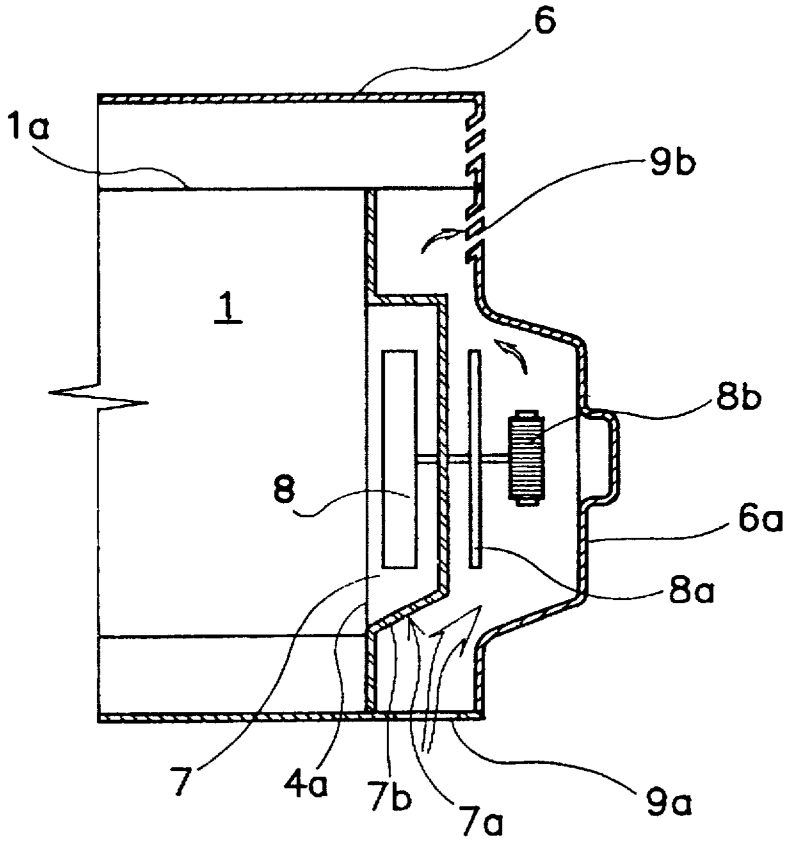
FIG.5 (PRIOR ART)
FIG. 5 is a partial side cross-sectional view showing a schematic construction of a prior art convection microwave oven.

FIGS. 3 and 4 show the shape of the protective cover 80 in detail. As shown in FIG. 3, the protective cover 80 has a central surface as well as 81, a top surface 82, right and left side surfaces 83 and 84, and a bottom surface 85, which are angled obliquely from the central surface 81.

A plurality of intake holes 80*a* are formed on the central surface 81, and a plurality of exhaust holes 80*b*, 80*c*, and 80*d* are formed on the top surface 82, bottom surface 85, and left side surface 84, respectively (refer to FIG. 3). The right side surface 83 has no exhaust holes. The reason for this is to prevent the hot exhaust air given off by the cooling fan 71 from being drawn into the electric component compartment 200 (refer to FIG. 1) through intake holes 12*e*, because the intake holes 12*e* are formed on the right extending plate 12*d* of the inner case 10.

As shown in FIG. 4, on the exhaust holes 80*b* are formed guide projections 82*a* projected outward from the exhaust holes 80*b*, so that if water drips on the exhaust holes 80*b*, the outward guide projections 82*a* prevent the water from running into the exhaust holes 80*b*. The intake holes 80*a* formed on the central surface 81 have inward guide projections 81*a* slopped toward the center axis A of the intake holes 80*a*, so that foreign materials such as toothpicks or pins can not be inserted into the intake holes 80*a*.

Further, a spacer protuberance 81*b* projected outward from the central surface 81 to a predetermined length is formed, so that the intake and exhaust holes 80*a* and 80*b* formed on the protective cover 80 are spaced, at a predetermined interval, from an external wall by which the microwave oven is placed. The outward guide projections 82*a*, the inward projections 81*a*, and the spacer protuberance 81*b* are formed integrally with the protective cover 80.

The operation of the convection microwave oven according to the present invention will now be described.

If the start button is depressed to cook the foods by the high frequency heating, a cooling fan (not shown) located in the electric component compartment 200 automatically turns on to draw the outside air in, thereby removing moisture from the inside of the cooking chamber 100. Simultaneously, a high voltage is applied to the magnetron 201, so that high frequencies irradiate from the magnetron 201 to the food in the cooking chamber 100 to execute the cooking process.

Also, the food can be cooked by the forced convection of hot air together with the high frequency heating as follows.

At first, when the electric power is supplied to the electric heater 101, heat is generated by the heater 101. At the same time, by the operation of the blower fan 61, the air inside the cooking chamber 100 is drawn in the area where the blower fan 61 is placed through the intake holes 121 and it is guided upward by the duct 50. The air is again exhausted to the cooking chamber 100 through the exhaust holes 122, so that the heat generated by the electric heater 101 is forced to the food by the air. Therefore, the heat is dispersed and transferred to the cooking chamber 100 to cook the food evenly.

With the operation of the electric heater 101 and the blower fan 61, the cooling fan 71 is also operated. When the cooling fan 71 rotates, the outside air is drawn in the protective cover 80 through the intake holes 80*a* to cool the motor 63, and then it is exhausted through the exhaust holes 80*b*, 80*c*, and 80*d*. At this time, since no holes are formed on the right surface 83 of the protective cover 80, the high temperature exhaust air can not enter the electric component compartment 200.

As mentioned above, according to the convection microwave oven, because water flowing down from the top surface of the protective cover bypasses the exhaust holes formed on the top surface of the protective cover by the outward guide projections formed on the exhaust holes, it does not permeate inside the microwave oven. Rather, the water flows downwardly and falls off the cover. Therefore, breakdown and short-circuit of the motor installed in the inside of the protective cover can be prevented.

Further, because the intake holes formed in the central surface of the protective cover have the inward guide projections slanted downwardly toward the bottom, foreign materials such as small sticks or pins can not be inserted into the intake holes.

Furthermore, because of the spacer protuberance formed on the central surface of the protective cover, the intake and exhaust holes are spaced, at a predetermined interval, from an external wall by which the microwave oven is placed. Hence the radiation of heat by the cooling fan is achieved effectively.

What is claimed is:

1. A microwave oven comprising:

a housing forming a cooking chamber;

a high frequency generator for supplying high frequency to the cooking chamber to perform microwave cooking;

a heater for supplying heat to the cooking chamber to perform convection cooking;

a cooling chamber disposed rearwardly of the cooking chamber and housing a motor and cooling fan, the cooling chamber including a protective cover defining a back wall of the cooking chamber;

the protective cover including a central surface, and a plurality of additional surfaces all extending obliquely forwardly from respective edges of the central surface; the additional surfaces including a top surface, a right side surface, a left side surface and a bottom surface; the central surface including air intake holes formed therein, each of the top surface, the bottom surface, and only one of the right and left side surfaces including air exhaust holes formed therein.

2. The microwave oven according to claim 1, wherein the top surface includes projections extending rearwardly over respective ones of the air exhaust holes thereof for resisting the passage of water through those air exhaust holes and into the cooling chamber.

3. The microwave oven according to claim 2, wherein the central surface extends substantially vertically and includes projections extending forwardly from an edge of respective ones of the air intake holes and inclined toward a central axis of the respective holes to resist the entry of foreign objects into the air exhaust holes.

4. The microwave oven according to claim 3 wherein the central surface includes a rearward protuberance extending rearwardly past the air intake holes to space the air intake holes from an external surface located adjacent the microwave oven.

5. The microwave oven according to claim 1 wherein the central surface extends substantially vertically and includes projections extending forwardly from an edge of respective ones of the air intake holes and inclined toward a central axis of the respective holes to resist the entry of foreign objects into the air exhaust holes.

6. The microwave oven according to claim 5 wherein the projections are inclined forwardly and downwardly from an upper edge of respective air intake holes.

7. The microwave oven according to claim 1 wherein the central surface includes a rearward protuberance extending rearwardly past the air intake holes to space the air intake holes from an external surface located adjacent the microwave oven.

8. The microwave oven according to claim 1, further including a components chamber situated next to the cooking chamber for housing the high frequency generator; the microwave oven including a rear plate to which the protective cover is mounted; the rear plate including air intake holes leading to the components chamber, one of the side surfaces having no air holes formed therein and situated adjacent the air intake holes of the components chamber.

* * * * *